(12) United States Patent
Warren et al.

(10) Patent No.: US 11,424,045 B2
(45) Date of Patent: Aug. 23, 2022

(54) METHOD FOR RADIATION SHIELDING

(71) Applicant: Warren Environmental & Coating, LLC., Middleborough, MA (US)

(72) Inventors: Danny Warren, Carver, MA (US); Christopher Messier, Westport, MA (US)

(73) Assignee: Warren Environmental & Coating, LLC, Middleborough, MA (US)

( * ) Notice: Subject to any disclaimer, the term of this patent is extended or adjusted under 35 U.S.C. 154(b) by 0 days.

(21) Appl. No.: 17/096,115

(22) Filed: Nov. 12, 2020

(65) Prior Publication Data
US 2021/0142922 A1 May 13, 2021

Related U.S. Application Data

(63) Continuation of application No. 14/830,174, filed on Aug. 19, 2015, now abandoned.

(51) Int. Cl.

| | |
|---|---|
| *G21F 1/10* | (2006.01) |
| *C09D 5/32* | (2006.01) |
| *C09D 163/00* | (2006.01) |
| *G21F 9/30* | (2006.01) |
| *C09D 7/48* | (2018.01) |

(Continued)

(52) U.S. Cl.
CPC ............... *G21F 1/10* (2013.01); *C09D 5/32* (2013.01); *C09D 7/48* (2018.01); *C09D 163/00* (2013.01); *G21F 9/307* (2013.01); *B09B 3/21* (2022.01); *C08K 3/08* (2013.01); *C08K 2003/085* (2013.01); *C08K 2003/0812* (2013.01); *C08K 2003/0843* (2013.01); *C08K 2003/0856* (2013.01); *C08K 2003/0862* (2013.01);

(Continued)

(58) Field of Classification Search
CPC .. G21F 1/10; G21F 9/307; C09D 5/32; C09D 7/48; C09D 163/00; B09B 3/21; C08K 3/08; C08K 2003/0812; C08K 2003/0843; C08K 2003/085; C08K 2003/0856; C08K 2003/0862; C08K 2003/0887; C08K 2003/0893

See application file for complete search history.

(56) References Cited

U.S. PATENT DOCUMENTS

| 4,185,132 A | 1/1980 | Gurney |
| 7,037,958 B1 | 5/2006 | Hansen et al. |

(Continued)

*Primary Examiner* — Andrew J. Oyer
(74) *Attorney, Agent, or Firm* — Barlow, Josephs & Holmes, Ltd.

(57) ABSTRACT

A composition and method for spray-applying a two-part, self-setting composition containing a dopant that provides a hazard shielding component and is particularly adapted for delivering the components of the composition at a temperature that promotes their spray application as well as a self-setting reaction. The method includes selecting a self-setting compound that is adapted for curing in place once applied, the self-setting compound including at least one dopant material; and applying the compound to a hazard to be encapsulated such as a radiological, lead, asbestos, or PCB. Alternately, a self-curing compound includes a multi-part compound which, upon a mixing of the parts, chemically reacts and cures, and at least one dopant material dispersed into at least one of the parts, wherein the dopant material is selected for providing radiation shielding upon application of the compound.

3 Claims, 1 Drawing Sheet

(51) Int. Cl.
*C08K 3/08* (2006.01)
*B09B 3/21* (2022.01)
(52) U.S. Cl.
CPC .............. *C08K 2003/0887* (2013.01); *C08K 2003/0893* (2013.01)

(56) References Cited

U.S. PATENT DOCUMENTS

| | | | |
|---|---|---|---|
| 2008/0167401 A1 | 7/2008 | Robinson et al. | |
| 2009/0198007 A1* | 8/2009 | Wang | C08K 3/30 524/440 |
| 2014/0225039 A1* | 8/2014 | Chiang | G21F 1/02 427/430.1 |

* cited by examiner

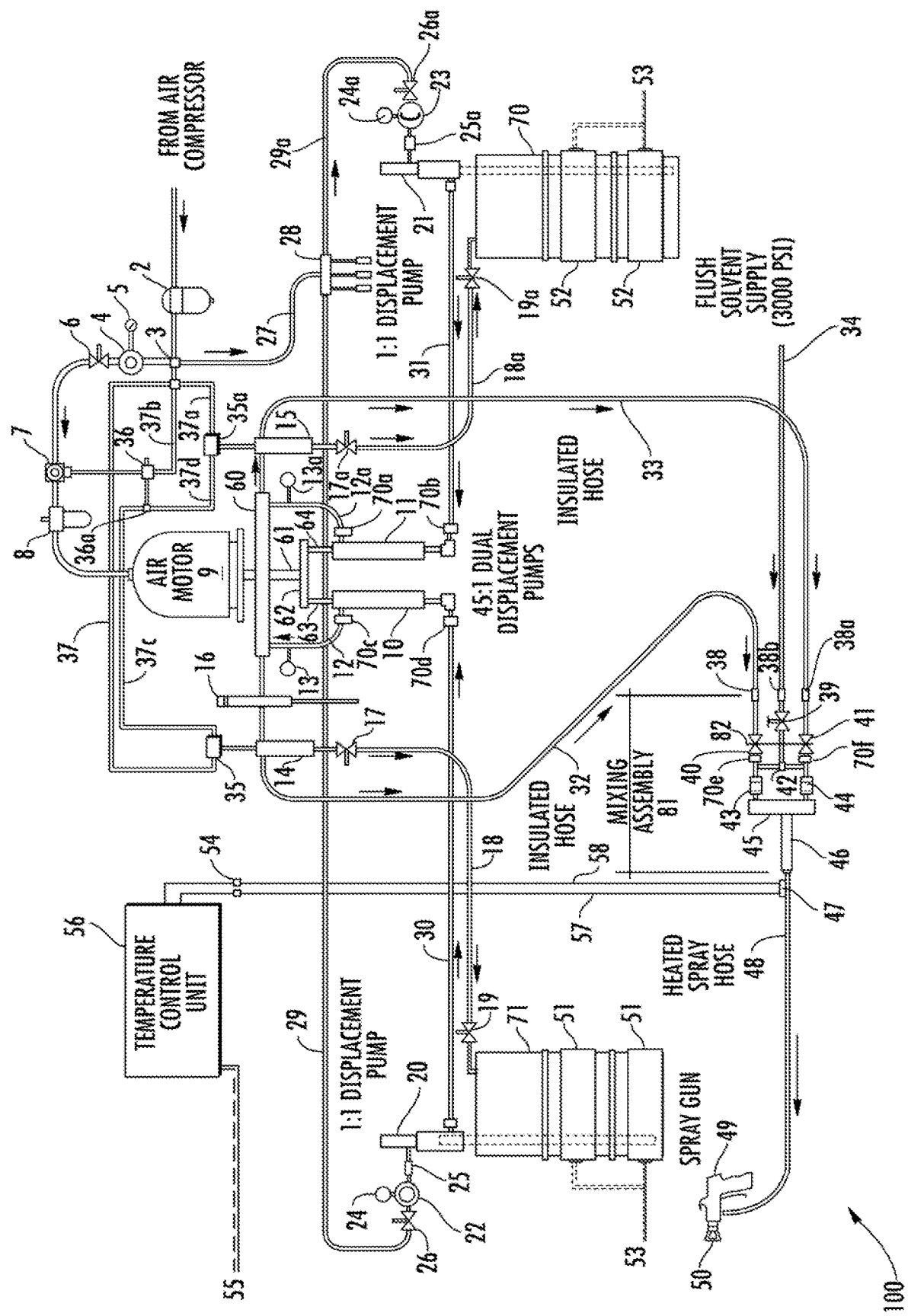

METHOD FOR RADIATION SHIELDING

CROSS-REFERENCE TO RELATED APPLICATIONS

This application is a continuation of U.S. patent application Ser. No. 14/830,174, filed Aug. 19, 2015.

BACKGROUND OF THE INVENTION

The present invention generally relates to a composition and method for spray-applying a two-part, self-setting composition containing a dopant that provides desired properties. More specifically, the present invention relates to a method and system for spray applying a composition that contains a hazard shielding component and is particularly adapted for delivering the components of the composition at a temperature that promotes their spray application as well as a self-setting reaction.

Generally, epoxy coatings are well known in the art and due to their exceptional durability and structural properties epoxy based protective coatings have gained commercial acceptance as protective and decorative coatings for use on a wide variety of materials. For example, epoxy based protective coatings represent one of the most widely used methods of corrosion control. They are used to provide long term protection of steel, concrete, aluminum and other structures under a broad range of corrosive conditions, extending from atmospheric exposure to full immersion in highly corrosive environments. Further, epoxy coatings are readily available and are easily applied by a variety of methods including spraying, rolling and brushing. They adhere well to steel, concrete and other substrates, have low moisture vapor transmission rates and act as barriers to water, chloride and sulfate ion ingress, provide excellent corrosion protection under a variety of atmospheric exposure conditions and have good resistance to many chemicals and solvents. As a result, numerous industries including maintenance, marine, construction, architectural, aircraft and product finishing have adopted broad usage of epoxy coating materials.

The most common material utilized in the epoxy coating industry today is a multi-part epoxy material. In general the epoxy includes a first base resin matrix and at least a second catalyst or hardener, although other components such as a pigment agent or an aggregate component may also be added. While the two parts remain separate, they remain in liquid form. After the two parts are mixed together, they begin a curing process that is typically triggered by exposure to heat, humidity or a ultra-violet light source, whereby the mixed material quickly begins to solidify. As a result, it is necessary to mix only a sufficient amount of compound such that it can be worked effectively before set up occurs. Accordingly, the use and application of these compounds is a tedious, slow and expensive proposition.

One such material, AQUATAPDXY (A-5 or A-6), is a proprietary, two-part self-setting compound which is designed to be applied under water or to wet surfaces. The product hardens into a ceramic like material which is resistive to chemical attack. This will set up into a coating that is smooth, hard and difficult to break or chip. This product, like most prior art coatings, has been difficult to use due to the preferred method of spray application. When attempting to spray apply an epoxy, two drawbacks are encountered. First, the material cannot be mixed in large batches prior to application because of the short pot life of the material. Accordingly, it must be mixed on an as needed basis immediately prior to spray application. Second, the naturally viscous consistency of the mixed epoxy material is not well suited for spray application.

To thin the epoxy to the consistency required for typical prior art spray application, the epoxy must be loaded with a large percent by volume of solvent. Such a solvent typically contains high level of volatile organic compounds (VOC) whose primary function is to lower viscosity thereby providing a consistency suitable for spray application with conventional air, airless and electrostatic spray equipment. The addition of the solvent to the epoxy coating material in turn greatly increases the VOC content of the epoxy coating material and reduces the build thickness of the finished and cured coating.

Accordingly, some advancement in applications technology has been developed. Among them are systems for controlling mixing and viscosity. While these systems have provided great advancements in use of some sealing compounds, there is still great room for improvement.

One example of an improvement discloses a spray application system and method for a two-part, self-setting compound, and provides needed advancement of application technology, opportunities for improvement remain. For example, in some instances, multiple coats of compound may be required. More specifically, due to the nature of a mixture of compounds that may be in use, a desired finish may not be attainable if the compounds are applied too thickly. Applying multiple coats necessarily requires additional time and energy, and therefore can be costly.

In contrast, attempts to apply a thick coating typically result in slumping of compound and may require considerable rework. In some environments, such as with underground piping, misapplication can be virtually disastrous.

In short, now that techniques for applications have been greatly improved, there are opportunities to further refine compounds suited for various applications. Thus, what is needed are methods and apparatus for efficiently applying sealing compounds in a production environment. Preferably, the methods and apparatus provide for a much thicker coating of material than previously achievable. Further, it is desirable to have methods and apparatus that enhance the variety of sealing compounds that may be applied and the increase applications for which the compounds may be used.

In view of the foregoing, there is a need for a method and system for spray-applying a two-part, self-setting composition containing a dopant that provides desired properties. Further, there is a need for a method and system for spray applying a composition that contains a hazard shielding component and is particularly adapted for delivering the components of the composition at a temperature that promotes their spray application as well as a self-setting reaction.

BRIEF SUMMARY OF THE INVENTION

In this regard, the present invention relates to a composition and method for spray-applying a two-part, self-setting composition containing a dopant that provides a hazard shielding component and is particularly adapted for delivering the components of the composition at a temperature that promotes their spray application as well as a self-setting reaction.

In one embodiment, a method for controlling a radiological hazard is provided. The method includes selecting a self-setting compound that is adapted for curing in place once applied, the self-setting compound including at least one dopant material; and applying the compound to a hazard to be encapsulated such as a radiological, lead, asbestos, or PCB hazard.

In another embodiment, a self-curing compound is disclosed. The self-curing compound includes a multi-part compound which, upon a mixing of the parts, chemically reacts and cures, and at least one dopant material dispersed into at least one of the parts, wherein the dopant material is selected for providing radiation shielding upon application of the compound.

Therefore, it is an object of the present invention to provide a method and system for spray-applying a two-part, self-setting composition containing a dopant that provides desired properties. Further, there is an object of the present invention to provide a method and system for spray applying a composition that contains a hazard shielding component and is particularly adapted for delivering the components of the composition at a temperature that promotes their spray application as well as a self-setting reaction.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

The foregoing and other features and advantages of the invention are apparent from the following detailed description taken in conjunction with the accompanying drawings in which:

FIG. 1 is a schematic diagram of an exemplary system for application of a two-part, self-setting compound.

DETAILED DESCRIPTION OF THE INVENTION

Disclosed herein are methods and apparatus for high volume application of self-setting compounds. In some embodiments, the self-setting composition that may include, for example, a two-part compound. One example includes an epoxy resin part with an appropriate activator part. Generally, such compounds generate heat during curing, where the epoxy resin chemically reacts with the activator. In some embodiments disclosed herein, the compound includes an appropriate dopant (or a mix of dopant materials) dispersed therein to provide shielding against a hazard enclosed therein.

Exemplary embodiments of suitable dopant materials include hydrogen rich compounds, metals and or metallic particles. Embodiments of the composition include at least one dopant that exhibits extraordinary properties. These extraordinary properties may be relied upon to provide for a variety of benefits not previously achievable. More specifically, and merely as some exemplary benefits, selecting and controlling various concentrations and/or combinations of dopant materials may be used to control the curing process of the compound and therefore resultant coating properties.

For instance, by making additions of a dopant material, the resultant coating is less likely to exhibit cracking. As another example, a thickness of an application of compound may be increased without a resulting slumping or rippling. Additional benefits may be realized in the application process, such as with an attendant reduction in pump pressure. Further, benefits may be realized with the final coating. As one example, coatings applied according to the teachings herein may provide for enhanced radiation shielding and/or absorption.

Some definitions are now provided as guidance. However, these definitions should not be construed as limiting of the teachings herein, and are merely provided to enhance the perspective of the reader.

As discussed herein, the term "compound" generally refers to a combination of materials that provide for a "coating." The combination of materials may be a two-part combination, or have more "parts." That is, parts of the compound are generally combined at the point of application, as described herein, to provide for the compound. Generally, the parts will react with each other, such as through cross-linking or otherwise polymerizing, to provide for the compound. Generally, the reaction process generates heat through an exothermic reaction. The heat generated may be measured over time to provide a time-temperature profile. The compound further may include a "dopant" material.

As discussed herein, application of the compound will result in a "coating." That is, generally, the compound is applied as a coating over an underlying substrate. However, it may be desirable, in some embodiments, to obtain cured compound that is separate from or free of the substrate. Therefore, merely as a matter of convention, cured compound is referred to herein as the "coating." However, this is not to be construed as a requirement for a presence of an accompanying substrate.

A "substrate" may include any type of material that a user, designer, manufacturer or other interested party wishes to coat with the compound. The substrate may include, for example, at least one of concrete, metal, tar, wood, plastic and other common materials. The substrate may be at least one of smooth, rough, fragmented, continuous, irregular and the like. In some embodiments, the substrate is one of dry, moist, wet, and immersed in a liquid, such as water.

As discussed herein, a "dopant" generally refers to particulate matter that may be dispersed into the compound. The dispersing may be provided at any time in advance of application of the compound, as deemed appropriate. The dopant may include at least one type of particulate. For example, the dopant may include metal or metallic particulate. The dopant may include forms of carbon such as graphite and/or carbon nanoforms. Aspects of the dopant may be varied as desired. For example, the dopant may include materials with varying particle sizes, conductivity, molecular weight, oxidation state, reactivity and the like. Generally, materials selected for use in the dopant are selected according to at least one of an effect upon the application process, an effect upon the curing process, and a resulting property of the coating.

Non-limiting and exemplary dopant materials include particulate forms of transition and post-transition metals, such as tungsten, lead, copper, aluminum, iron, nickel, cobalt, zinc and a variety of other metals. Alloys and oxides of base materials may also be used. More effective shields may sometimes be obtained by adding boron, lithium or lead to a polyethylene resin component in coatings thicker than 22 cm. In such cases the coating results in lower capture gamma-ray dose and effectively attenuates the source and the capture gamma-ray flux.

Dopant materials may be selected according to, for example, cost, availability, radiation shielding properties, chemical and physical relationships with the carrying compound, and the like. In one example, a hybrid dopant is selected where a heavier metal (such as tungsten) is employed to provide for shielding of gamma radiation, while another material with a high neutron absorption cross-section (such as boron) is added to provide for neutron absorption.

As referred to herein, the terms "radiation," "radiological," "contamination," "nuclear" and the like are generally with reference to sources or environments that include or generate directly or indirectly ionizing radiation (alpha, beta, gamma and neutron radiation).

In order to provide context for the teachings herein, a system for applying the compound, including embodiments of the compound with a dopant dispersed therein are now introduced.

A system for applying a two or more-part, self-setting compound is provided. The system provides for spraying the compound onto surfaces, including wet surfaces. The spray application system includes a source of the first part of the compound and a source of the second part of the compound, for example containers up to the size of 55 gallon drums, or possibly larger containers as necessary to supply the desired amount of the parts for application. There is a spray device for applying the compound, and a mixing assembly for combining the two parts of the compound. A heated hose downstream of the mixing device delivers the compound to the spray device. There is a first pumping means, which may include one or more pumps, for delivering the first part of the compound to the mixing device, and a second pumping means, which also may include one or more pumps, for delivering the second part of the compound to the mixing device.

Generally, the compound includes two liquid portions which are both very viscous and therefore difficult to pump. It has been found that the portions are easier to pump, and therefore easier to deliver to the spray device, if they are heated within the storage containers, and maintained in such a state all the way to the spray tip. This also facilitates more volumetrically-controlled delivery of each of the two portions of the compound to the spray device. Accordingly, the system generally includes means for heating the contents of the containers that hold the two parts of the compounds, for example by using temperature-controlled heaters. Recirculating pumps may be used in the containers to ensure mixing and uniform heating of the two portions. The heated hose may be heated by including an electrical resistance heating element for the hose and then using a temperature controlled power supply for the electrical resistance heating element to maintain an elevated compound temperature in the heated hose. The hoses may also be heated with steam. The hoses that carry the liquids from the containers to the mixing assembly should be insulated or possibly heated themselves as necessary to maintain the portions at an elevated temperature so they flow better, and for volume control at the spray gun.

The pumping means for each of the two portions of the compound may include a low pressure pump for drawing the portions out of the containers. Each of the pumping means may further include high pressure pumps, fed from the low pressure pumps, for elevating the pressure of the two portions delivered to the mixing assembly. The pumps are preferably positive displacement pumps which deliver carefully controlled volumes of each of the portions to the mixing assembly so that the compound is mixed in the ratio required to cure properly as set forth in the manufacturer's specification.

The mixing assembly preferably includes a static mixer with a mixing block upstream of the static mixer. There may further be included flow control valves upstream of the mixing assembly. The valves may be mechanically linked to operate in unison. There may also be included means for flushing the mixing assembly, hose and spray device. Flushing may be accomplished with a source of flushing solvent under pressure.

In a more specific embodiment, a spray application system for a two-part self-setting compound is provided and includes a first temperature controlled container for maintaining the first part of the compound at an elevated temperature, and a second temperature-controlled container for maintaining the second part of the compound at an elevated temperature. There are a pair of low pressure pumps for drawing the parts out of the containers, and a pair of high pressure pumps, fed from the low pressure pumps, for boosting the pressure of the parts. There is a static mixing assembly, fed from the high pressure pump, for combining the parts, a spray device for applying the compound, and a hose with a temperature-controlled heat trace therein for delivering the compound from the static mixing assembly to the spray device. The low pressure and high pressure pumps may be air operated positive displacement pumps. There may further be included hoses for carrying the parts from the low pressure pumps to the high pressure pumps. There may also be insulated hoses for carrying the parts from the high pressure pumps to the static mixing assembly. Finally, there may be means for supplying a flushing solvent under pressure to the static mixing assembly, the hose, and the spray device.

FIG. 1 depicts an exemplary embodiment of an apparatus 100 for applying compound. This apparatus 100 depicted in FIG. 1 has been developed for spray applying a variety of compounds provided within the disclosure. Further, the apparatus may be adapted as deemed appropriate for additional or other compounds.

Accordingly, the apparatus 100 of FIG. 1 is merely illustrative and is not limiting of the teachings herein. Turning now to FIG. 1, container 71, which may be a 55 gallon drum, holds part A of the compound, and container 70, which may also be a 55 gallon drum, holds part B of the compound. Both parts of the compound are very viscous at room temperature and are therefore difficult to pump and difficult to carefully, volumetrically deliver to the spray applicator. Part B is extremely viscous and almost impossible to pump at room temperature. The difficulty arises in that the parts must be delivered in carefully controlled flow streams so that they are mixed in the proper ratio for the desired purpose as established by the manufacturer. In one embodiment of the compound, the correct ratio of part A to part B is 1:1.

To reduce the viscosity of the components and enhance pumpability, the containers 70 and 71 are maintained at an elevated temperature using thermostatically controlled 120V drum heater belts 51 and 52 fed by 120V electric supply 53, and/or immersed temperature exchange coils, not shown, fed with hot water. Preferably, the part A supply drum is maintained at about 170 degrees Fahrenheit to 180 degrees Fahrenheit, and the part B supply drum is maintained at about 190 degrees Fahrenheit to 220 degrees Fahrenheit. This keeps the portions at about the same viscosity so that their volumetric ratio when they reach the spray tip is correct.

The two parts of the compound are delivered to spray gun 49 with two sets of pumping means, each of which includes a first, lower pressure positive displacement pump, and a second, higher pressure positive displacement pump fed by the first positive displacement pump. Positive displacement pumps are used because they can be calibrated to deliver very exact volumes of the liquids as desired.

The four pumps in the system are operated by compressed air as follows. Compressed air, from a diesel-fired trailer compressor is provided at pneumatic fitting 1. Airline filter 2 filters the primary air supply and includes a water separator. It has a maximum working pressure of 250 psi. Air manifold 3 distributes the filtered air as necessary. This lower pressure air is provided over line 27 which connects the main air supply to auxiliary air manifold block 28 to operate the lower pressure pumps which draw the parts out of the containers. From this manifold air is delivered over air supply hoses 29 and 29a to positive displacement pumps 20 and 21, respectively. The input air pressure to these pumps is adjusted as necessary using regulators 22 and 23 with pressure gauges 24 and 24a, respectively. Air shutoff valves 26 and 26a are included along with in-line air lubricators 25 and 25a. The air pressure to the part A pump 20 is preferably set to 70 psi and the air pressure to the part B displacement pump 21 is preferably set to 100 psi, because the part B is more viscous.

After the portions in the containers reach the desired temperature, pumps 20 and 21 are used to circulate the liquid within the drums to help provide even heating to the fluid, to keep the fluid components properly mixed, and to help remove any air entrained in the viscous liquid so that the sprayed coating does not have any pinholes from entrained air bubbles. This recirculation is accomplished by closing valves 40 and 41 and opening valves 17 and 17a. When it is desired to start applying the compound, valves 17 and 17a are closed and valves 40 and 41 are opened to direct the portions to the mixing assembly and spray gun, as explained below.

The part A of the compound is pumped through hose 30 to second, high-pressure positive displacement pump 10. Hose 30 is a 4000 psi working pressure hose insulated with a neoprene casing. Similarly, the part B of the compound is pumped to second, high-pressure positive displacement pump 11 through hose 31 which is also a 4000 psi working pressure hose insulated with a neoprene casing.

Pumps 10 and 11 are operated by air motor 9, with a 90 psi maximum air input pressure and a 4000 psi maximum output pressure. Motor 9 is supplied with air from manifold 3 through regulator 4 rated at 300 psi working pressure with a regulated range of between 0-125 psi, adjusted to operate at from 65 to 70 psi as read out by pressure gauge. Ball valve 6 is used for a shut-off. High pressure air shut-off 7 is an air solenoid controlled automatic shut-off valve for shutting off the supply to air motor 9 if the pressure of the output of pumps 10 or 11 is too high, as further explained below. 250 psi airline lubricator 8 has a 16 ounce bowl capacity.

The drive shaft 61 of motor 9 is coupled to shafts 63 and 64 of pumps 10 and 11, respectively, through member 62. This arrangement drives pumps 10 and 11 together so that they simultaneously deliver the exact same volume of parts A and B to the supply lines that feed spray gun 49. Pressure hoses 12 and 12a with pressure gauges 13 and 13a feed components A and B from pumps 10 and 11, respectively, to liquid manifold 60. High pressure relief valve 16 in manifold 60 is a blow-off valve set to actuate at 3500 psi on the part A pressure side. Component A filter cylinder 14 contains a 60 mesh screen to filter particulates. The system is set up to recycle some or all of the part A flow to container 71 through line 18 as controlled by recycling shut-off valve 17 at the bypass position of filter cylinder 14 and high pressure gate valve 19 to control the rate of flow recycling to drum 71. Part B component filter cylinder 15 has had the filter mesh removed to remove the flow restriction caused by the filter mesh. There is a similar return arrangement to container 70 using line 18a and valve 17a and 19a that are identical to the components on the part A side.

Each of filter cylinders 14 and 15 has a pressure activated switch 35 and 35a, respectively, which monitors the component pressure at the filter outlet. The operating range of switches 35 and 35a is 350 to 5000 psi. The switches are set to actuate main air shut-off 7 at 3500 psi. Switch 35 is supplied with air through line 37 and switch 35a is supplied with air through line 37a. When either switch is operated it provides air through line 37c or 37d as appropriate to portion 36a of air shut-off reset control switch 36 which is caused to supply air provided to it over line 37b to shut-off 7 to close the main air supply to air motor 9. Valve 36 is an over-run control valve that can be set to shut off air supply when the pressure is too high or too low. This arrangement results in motor 9 being shut-off if the output of either pumps 10 or 11 goes above 3500 psi.

Component A is provided to mixing assembly 81 through insulated hose 32. Similarly, component B is provided to mixing assembly 81 through insulated 33. Hoses 32 and 33 are both connected via quick disconnect couplings 38 and 38a couple hoses 32 and 33, respectively, to mixing assembly 81. Assembly 81 includes stainless steel through-hole mixing block 45, and a stainless steel helical static mixer 46. Ball valves 40 and 41 are mechanically linked together with operating assembly 82 so that the valves can be opened and closed together to carefully control the flow of both components into mixing block 45. Part A flow control valve 43 is an adjustable in-line restriction valve set at approximately 40% restriction. Component B in-line flow control valve 44 is also an adjustable in-line restriction valve set at the full open position. This arrangement helps to achieve the same flow rate in each line for the desired 1:1 mixing.

Heated spray hose 48 has integral heat trace and protective wrap to maintain the mixed compound at approximately 225 degrees Fahrenheit so that it flows freely through hose 48 to spray gun 49. Also, this provides the mixed compound at an elevated temperature which decreases the set-up time. The temperature of hose 48 is controlled using electronic monitoring and temperature control unit 56 which provides power over 240V heavy duty thermostatically controlled spray hose heat trace 57 set to 225 degrees Fahrenheit. The temperature of the hose is sensed with thermocouple heat sensor 58. Electrical heavy duty locking plug connections 54 couple unit 56 to heat trace 57 and temperature sensor 58. Unit 56 is provided with 240V power over lines 55.

Check valves 70a through 70e, 43 and 44, ensure that the flow of these viscous liquids is always in the proper direction, with no backflow which would change the volume ratio of the portions of the compound which could lead to an incorrect mix at the spray gun.

When the spray application process has been completed, it is important to flush the mixed compound as quickly as possible from mixing assembly 81, hose 48 and spray gun 49 to keep those components clean. This is accomplished using alcohol as a flush solvent provided at 3000*psi* over hose 34 coupled to quick disconnect 38b. High pressure gate valve 39 controls the flow of solvent into flush solvent tee 42 which routes the solvent to valves 43 and 44 and then into mixing block 45, etcetera.

Having thus disclosed an exemplary embodiment of the apparatus 100, further aspects of an exemplary compound are provided.

In an exemplary compound, epoxy resin and an activator were mixed with a dopant that included a tungsten (W) particulate. Specifically, the tungsten was in a powder form. The tungsten had a purity of about 99.95 percent. An average particle size for the tungsten powder was between about 1 micron to about 1.5 micron.

A batch of compound doped with tungsten (referred to as a "test batch") was prepared and applied to various substrates, in various thicknesses and orientations. The test batch had a cure time of approximately 0.5 hrs (30 min).

In the development and application of the test batch, it was learned that the combination of these materials exhibited a positive effect on flow resistance running through the hoses during the application process. Pneumatic pump pressures were lower than expected, and were generally about 500 psi. This was tested on a 10 ft pump-to-nozzle hose length. In contrast, pressure required for compound without doping are often much greater, and may be generally of about 2,000 psi for the same apparatus. As an increase in the pump-to-nozzle hose length calls for increased pressure at the pump, use of dopant in the compound will allow for longer pump to nozzle distances. This is particularly beneficial in environments where highly radioactive or otherwise contaminated areas are involved.

Layup thickness on a vertical surface with the test batch was up to about ¾ inches. The application process used was "spray on." The layup thickness was achieved in a single application. Considerably greater product thicknesses may be achieved by stepping the product through appropriate cure periods.

The infusion of metal, in this case tungsten, in the test batch had a positive effect on reducing the cure temperature. The metal increased the ability of the product to dissipate heat during curing. Generally, curing temperature for an undoped embodiment of the compound is about 149 degrees Celsius (300 degrees Fahrenheit). In contrast, a maximum measured cure temperature from the doped compound was approximately 107 degrees Celsius (225 degrees Fahrenheit). Use of the dopant will provide for greater flexibility when applying the compound as greater product thickness are achievable without cracking when curing occurs at lower temperatures.

Early shielding effectiveness of the material using 660 keV photons, indicates that the half value thickness for this formula is approximately ¼ inches.

The properties exhibited by the test batch shows that doped compound provides many advantages for encapsulation of contamination, particularly contaminated concrete surfaces. The addition of an appropriate dopant will reduce ambient dose rates and prevent the spread of contamination or cross contamination to other surfaces. Particular benefits of note for working with radiological applications, include a capability of the material to set up quickly and in a variety of environmental conditions. Bonding with metal and concrete is exceptional (wet or dry).

The shear strength of the compound will not limit demolition of underlying substrate, such as concrete surfaces and will allow for standard decontamination and decommissioning work practices.

Various measurements were performed to ascertain radiation shielding properties of the test batch. Comparative measurements were performed to provide an estimation of a half-value layer for the resultant coating. A radiation source that contained cesium 137 was selected for use. The source used was about six micro_Curies in activity. The source was used to quantify the density of a flexible coating, a less flexible coating, and a coating that included the tungsten powder.

As a first step, samples of coating were analyzed to obtain respective density. Samples were cut to a size permitting volume determination by liquid displacement in a graduated cylinder. Each of the pieces were weighed and a volume of each sample was then determined using a graduated cylinder filled with water to 300 ml. The 300 ml volume was sufficient to provide complete immersion of each of the pieces. Results are provided in Table 1.

TABLE 1

| Density Values | | | |
|---|---|---|---|
| Coating Sample | Mass (g) | Volume (cubic cm) | Density (g/cubic cm) |
| 1. Flexible | 51.32 | 50 | 1.025 |
| 2. Less Flexible | 60.77 | 50 | 1.215 |
| 3. Tungsten Dopant | 144.57 | 80 | 1.807 |

A series of shielding evaluations were then made. In these evaluations, the radiation source was placed on one side of each sample, and a suitable radiation detector (a Geiger Mueller detector) was placed on an opposite side of the respective sample. Values obtained are presented in Tables 2 and 3.

TABLE 2

| Shielding (Beta and Gamma) | | | | |
|---|---|---|---|---|
| Material | Distance | Layers | Count/min | Reduction |
| None | ¼" | 0 | 273,000 | |
| W | ¼" | 1 | 118,000 | 0.43 |
| None | ½" | 0 | 190,000 | |
| W | ½" | 2 | 70,000 | 0.36 |

TABLE 3

| Shielding (Gamma Only) | | | | |
|---|---|---|---|---|
| Material | Distance | Layers | Count/min | Reduction |
| None | ¼" | 0 | 195,000 | |
| W | ¼" | 1 | 115,000 | 0.59 |
| None | ½" | 0 | 150,000 | |
| W | ½" | 2 | 75,000 | 0.50 |

Accordingly, having thus disclosed aspects of the compound, and methods for applying the compound, it should be understood that a variety of applications may benefit from this technology. As one example, consider a variety of applications in the nuclear industry. Non-limiting benefits that may be realized in the nuclear industry include rapid encapsulation of contamination in wet, moist or dry environments. The encapsulation has the collateral benefit of providing radiation shielding. This is particularly beneficial in environments such as draining of fuel pools for final decommissioning, draining and sealing of tanks and pipes and the like.

Aside from a process that results in effective contamination control, improved workability results in reductions to personnel applying the compound. That is, with an ability to apply a relatively thick coating that provides radiation shielding, radiation dose to personnel may be greatly reduced. Further, with a reduced requirement for line pressure, it is possible to maintain a mixing station and pumping equipment that are remote from hazardous areas.

It should be recognized that the teachings herein are merely illustrative and are not limiting of the invention. Further, one skilled in the art will recognize that additional components, configurations, arrangements and the like may be realized while remaining within the scope of this invention. For example, configurations and applications of dopants, curing time, layers and the like may be varied from embodiments disclosed herein. Generally, design and/or application of compounds and techniques for making use of the compounds are limited only by the needs of a system designer, manufacturer, operator and/or user and demands presented in any particular situation.

Various other components may be included and called upon for providing for aspects of the teachings herein. For example, additional materials, combinations of materials and/or omission of materials may be used to provide for added embodiments that are within the scope of the teachings herein.

When introducing elements of the present invention or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

In the present application a variety of embodiments are described. It is to be understood that any combination of any of these variables can define an embodiment of the invention. For example, a combination of a particular dopant material, with a particular compound, applied in a certain manner might not be expressly stated, but is an embodiment of the invention. Other combinations of articles, components, conditions, and/or methods can also be specifically selected from among variables listed herein to define other embodiments, as would be apparent to those of ordinary skill in the art.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A method of encapsulating a hazardous substrate with a spray applied epoxy composition, comprising:
   providing a resin component between about 190 degrees Fahrenheit to 220 degrees Fahrenheit;
   blending a dopant material selected from the group consisting of: tungsten, lead, cobalt, boron and combinations thereof, said dopant shielding against said hazardous substrate, into said resin component; and
   providing a hardener/activator component at between about 170 degrees Fahrenheit to 180 degrees Fahrenheit;
   wherein said resin component containing said dopant is mixed with said hardener/activator during a spray application process to form an epoxy composition that encapsulates said hazardous substrate.

2. The method of claim 1, wherein said dopant is selected from the group consisting of: tungsten, boron and combinations thereof having a high neutron absorption cross-section for neutron absorption for shielding of gamma radiation.

3. The method of claim 1, wherein the hazardous substrate is selected from the group consisting of: radiological, lead, asbestos and PCB hazards.

* * * * *